July 23, 1968 R. T. ELLIS ET AL 3,394,313
SYMMETRICALLY PHASE MODULATED TRANSMISSION
SYSTEM WITH MULTI-LOBED
MODULATING SIGNALS
Filed Sept. 14, 1964

RICHARD T. ELLIS
JOHN WALTON
RICHARD B. KERSHNER
INVENTORS

BY
Claude Funkhouser
ATTORNEY

United States Patent Office 3,394,313
Patented July 23, 1968

3,394,313
SYMMETRICALLY PHASE MODULATED TRANSMISSION SYSTEM WITH MULTI-LOBED MODULATING SIGNALS
Richard T. Ellis, Clarksville, Md., John Walton, Seattle, Wash., and Richard B. Kershner, Silver Spring, Md., assignors to the United States of America as represented by the Secretary of the Navy
Filed Sept. 14, 1964, Ser. No. 396,438
3 Claims. (Cl. 325—163)

ABSTRACT OF THE DISCLOSURE

The present invention generally relates to a method of carrier frequency transmission wherein the carrier frequency is phase modulated, to convey binary information, in such a manner that the average or integrated phase shift is maintained at substantially zero. As a result, the carrier frequency retains its usefulness for accurate Doppler tracking, for example, of the transmitter-carrying satellite. More particularly, each binary bit to be communicated on the carrier frequency contains at least one positive and one negative modulating lobe corresponding respectively to equal, but opposite, phase shifts of the carrier. In this manner, the integrated phase shift to which the modulated carrier frequency is subjected substantially zero, for each binary code bit and throughout the entire code, regardless of the binary code content, code length or integration time.

---

This invention relates generally to Doppler tracking systems, and more particularly, to a transmission system utilizing phase modulated carrier signals to transmit information and provide tracking data simultaneously.

One method of accurately tracking an orbiting satellite is to measure the Doppler shift to a radio signal transmitted from the satellite. The satellites generally carry transmitters aboard for radiating very stable continuous wave signals to ground tracking stations. The ground stations contain computing equipment enabling the Doppler shift, or shift in the frequency of the continuous wave, to be measured as the satellite passes within line of sight of the station. The orbital parameters of the satellite may then be determined from the measured Doppler shift at the station. Additionally, the location of a ground station or of any receiving unit may be determined if the continuous wave of the satellite transmission and orbital parameter intelligence can be received. William H. Guier, in his U.S. patent application No. 224,580, filed Sept. 18, 1962, and which has now matured into U.S. Patent No. 3,191,176, issued June 22, 1965, assigned to the United States of America, represented by the Secretary of the Navy, describes such a navigation system in which an orbiting satellite transmits both a continuous wave and an information signal describing its orbital parameters to a receiving unit at an unknown location. Since both the continuous wave and the parameter signals must be transmitted to the receiving station, the use of separate transmitters to transmit each signal has been contemplated. However, there is an obvious need to reduce the number of transmitters contained within a satellite, originating from space and weight requirements. Therefore, the number of transmitters aboard a satellite may be reduced by combining the functions of the two separate transmitters in a single transmitter by adding the orbital parameter data in the form of phase modulation to the continuous wave signal.

The present invention contemplates a transmission system in which one transmitter, located aboard an orbiting satellite, transmits a continuous wave which is phase modulated by an information signal. One of two phase modulating wave configurations are selectively generated to transmit intelligence in binary form. A waveform having an integrated value of zero is utilized as a modulating wave indicative of a binary one, while the mirror image or reversed polarity waveform is indicative of a binary zero. Due to the symmetry of both of the modulating waveforms, the integrated phase shift of the carrier caused by the modulating intelligence is reduced to zero and independent of message content. If the Doppler signals were phase modulated by unbalanced or asymmetrical waveforms, the binary information would be satisfactorily transmitted, but there would be an intolerably large integrated phase shift of the carrier which would vary with the message content. In conventional phase modulation applications, an asymmetrical phase shift in the carrier is of no consequence. In Doppler tracking systems, however, a phase shift of the carrier appears to the receiver as a shift in frequency and seriously affects the accuracy of the computations made from the transmission.

A second characteristic of the waveform that is of significance is the dwell time that is spent on any phase other than the nominal phase. Since the intelligence is conveyed by departing from the nominal a compromise must be made which satisfies the requirements of minimum dwell and a given phase while at the same time allowing sufficient time for the ground equipment to utilize its narrow bandwidth in recognizing the signal. This compromise is accomplished by sending the bit twice so that the dwell on any phase is cut in half without reducing the bit integration time.

Accordingly, an object of the present invention is to provide a transmisison system for phase modulating a continuous wave carrier with a minimum integrated phase shift of the carrier and minimum dwell time on any phase.

Another object of the present invention is to provide a method for transmitting two intelligence signals with a single transmitter.

Another object of the present invention is to provide a method for transmitting a continuous wave Doppler signal which carries intelligence in the form of phase modulation.

Other objects and many of the attendant advantages of this invention will be readily appreciated as the same becomes better understood by reference to the following detailed description when considered in connection with the accompanying drawings, wherein.

Figure 1:
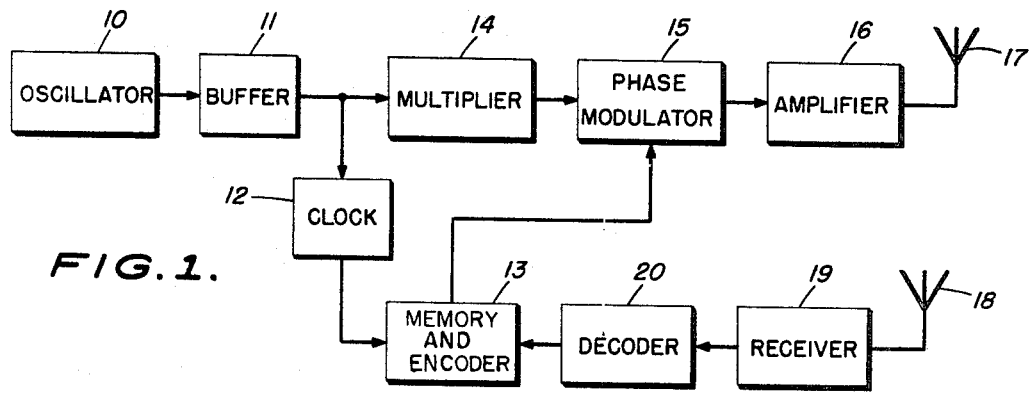
FIG. 1 is a block diagram of the apparatus located aboard a satellite in accordance with the present invention.

Referring to FIG. 1, a block diagram of the transmitter receiver combination carried aboard an orbiting satellite is illustrated. A temperature controlled oscillator 10 is the source of the continuous wave signals which are broadcast from the satellite. The oscillator 10 applies its output to a buffer circuit 11, providing isolation from the succeeding circuitry. The output of the buffer 11 is applied to a clock 12 which controls the operation of a memory and encoder unit 13. The output of the buffer 11 is also applied to a frequency multiplier 14, and, in turn, to one input of a phase modulator 15. The output of the memory and encoder unit 13 is applied to the other input of the phase modulator 15. The output of the modulator 15 is applied to an amplifier 16 for broadcasting from an antenna 17 to a receiver.

As mentioned previously, it is proposed in accordance with the present invention that the phase modulator 15 produce symmetrical modulation of the carrier frequency to be transmitted. One form of phase modulating circuitry capable of producing such symmetrical modulation, in response to stored binary data, is disclosed in the U.S. Patent to Roy F. Sloan, No. 3,263,188.

An antenna 18 receives information defining the parameters of the orbital path of the satellite from a ground tracking station. These parameters may be determined in any one of several conventional ways, including the manner described in U.S. patent applicaion Ser. No. 224,580 of William H. Guier. This information, which may conveniently be transmitted by means of a modulated carrier signal, is applied to the input of a receiver 19. The receiver includes a demodulating stage and extracts the orbital path information from the carrier, applying it to a decoder 20. The decoder 20, in any one of several conventional techniques, converts the information to binary form for storage in the memory 13. At predetermined time intervals, during which the satellite is within broadcasting range of an earth station of unknown location, the clock 12 applies a pulse to an input of the memory and encoder unit 13, and causes the orbital information to be read out to the phase modulator 15 as symmetrical phase modulating waveforms to be described hereinafter.

As shown in the drawings and mentioned previously, the unit 13 includes both a memory portion which responds to and stores the output of decoder unit 20, as binary information, and an encoder portion which responds to the stored binary information in the memory and produces the desired, symmetrical phase modulating waveforms proposed in accordance with the present invention. The encoder portion of unit 13 may be of conventional digital logic design and its output modulating waveforms are applied to and control the phase modulator 15 in such a manner that the output carriier frequency from multiplier 14 is symmetrically phase modulated; i.e., without producing an integrated or average phase shift of the carrier frequency.

Figure 2:
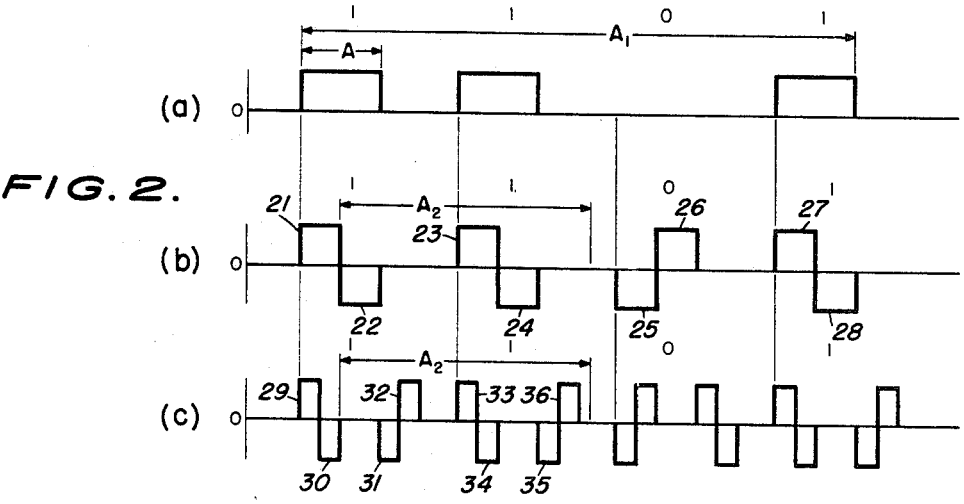
FIGS. 2a–2c are graphs of the modulating waveforms illustrating the manner in which the minimized integral phase shift is achieved by the apparatus of FIG. 1.

Referring now to FIGS. 2a–c, the manner in which the phase shift of the carrier may be minimized in a phase modulated transmitting system may be understood. FIG. 2a illustrates the modulating waveforms employed in a conventional phase modulation system. A binary one is represented by a positive pulse of predetermined duration, and causes the phase of the carrier to be advanced. A zero level modulating pulse is indicative of a binary 0, and causes the phase of the carrier to be held at zero phase during its duration. FIG. 2a thus illustrates the modulating waveforms utilized to transmit the binary quantity 1101. Of course, the system may utilize a zero level pulse to indicate a binary 1 and a positive level pulse to indicate a binary 0. Further, various combinations of positive, negative, and zero pulses may be utilized to represent binary quantities. The amount of phase shift indicative of the binary quantities is determined by various design considerations and may be achieved by any of several well-known techniques. A 60° advance and a 60° retardation in phase of the carrier has been successfully employed in the present invention.

Assume that the carrier frequency is measured by a receiving station during the time period A to compute the Doppler shift thereof. During the period A, the carrier will be advanced in phase and the error filter will integrate this shift. The integrated phase shift will appear to the Doppler measuring equipment as an increase in frequency. Even if the time period of Doppler frequency measurement is lengthened to a period $A_1$, there will still be an integrated phase shift of the carrier. A phase shift is unavoidable because the modulating pulses are non-symmetrical. Even if a binary zero were represented by a negative pulse rather than a zero level voltage, modulation of the carrier would cause a phase shift. There would, of course, be no average phase shift of the carrier if an equal number of 1's (positive pulses) and 0's (negative pulses) were completely transmitted during a Doppler counting period, but this would very seldom occur.

FIG. 2b illustrates a train of symmetrical waveforms, each containing a plurality of lobes 21–28, which may be produced by the encoder portion of unit 13 and utilized as modulating pulses to convey binary intelligence. The waveforms represent the binary quantities 1 and 0 as indicated, both waveforms being symmetrical and 180° out of phase with each other. If the Doppler count were measured over the period A, there will be no average phase shift. The advance in phase due to the positive level lobe 21 is exactly offset by the retardation in phase due to the negative level lobe 22. If the Doppler count were measured during the time period $A_1$, there will still be no integrated phase shift as there are an equal number of positive and negative lobes in the modulating waveforms and their effects on the phase of the carrier offset each other.

As seen in FIG. 2b, the Doppler shift is often measured over a time period $A_2$ which does not exactly coincide in duration with an integral number of modulating pulses. Even so, the symmetrical character of the modulating waveforms provides a greatly reduced or minimized integrated phase shift. No average phase shift is produced by the lobes 22 and 23 as they offset each other. The carrier is retarded in phase only during the time duration of lobe 24 as its phase shifting effect is not offset.

Referring to FIG. 2c, another train of waveforms formed of lobes 29–36, which also may be produced by the encoder of unit 13 and used as an alternate form of modulating pulses to convey binary intelligence, are illustrated. These waveforms, which represent the binary quantities 0 and 1, as indicated, each contain two positive and two negative lobes. Assume that the Doppler frequency measurement is measured over the period $A_2$. The phase shifting effect of lobes 31, 34 and 35 is exactly offset by the effect of lobes 32, 33 and 36, and thus there is no integrated phase shift for this situation.

It is to be noted, as may be seen from the discussion of the waveforms of FIGS. 2a–c above, that the phase shift of the carrie during a Doppler counting period is reduced in proportion to the number of lobes contained in each of the modulating waveforms. This is evident because an average phase shift is caused only by a portion of a lobe which is not completely offset by another lobe of opposite polarity. Since the lobes of the more complex modulating waveforms of FIG. 2c have a shorter period than the waveforms of FIG. 2b, they will produce less integrated phase shift. Of course, for many applications the phase shift introduced by the waveforms of FIG. 2b is sufficiently minimal. It is seen that the effect of phase shift is reduced both by extending the Doppler counting period in relation to the period of a modulation waveform and by utilizing more complex waveforms having a greater number of positive and negative lobes.

Figure 3:
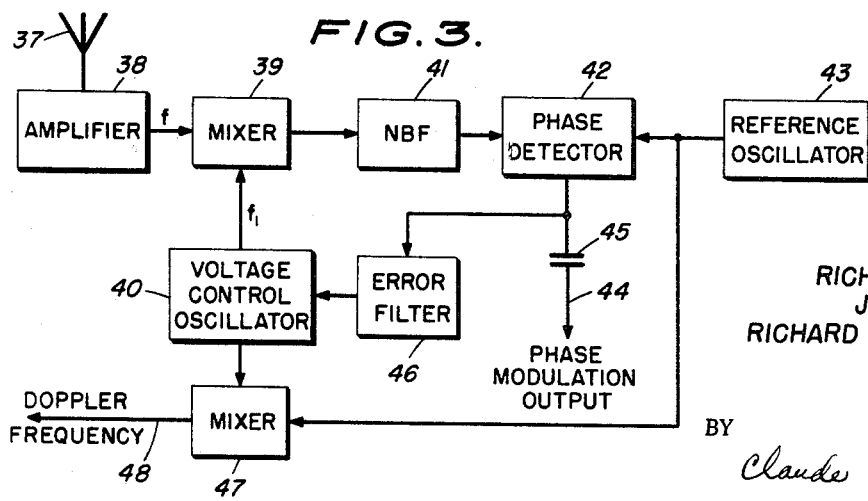
FIG. 3 is a block diagram of a receiver utilized in the present invention and located at a receiving station.

Referring now to FIG. 3, a receiver is illustrated which is utilized at a ground receiving station to receive the modulated Doppler transmission from the satellite. The transmitted wave is received at an antenna 37 and applied to the input of an amplifier 38. The modulated carrier output of frequency $f$ is applied to one input terminal of a mixer 39 from the amplifier 38. The modulated carrier is mixed with the output of frequency $f_1$ of a voltage controlled oscillator 40, applied to the output of the mixer. The outputs $f$ and $f_1$ are kept one megacycle apart in frequency in a manner to be explained, and produce a 1 mc. output from the mixer. The 1 mc. output is applied to the input of a narrow band filter 41 which provides at its output a clean signal relatively free from transients and noise. The clean 1 mc. signal is then applied to one input of a phase detector 42. A 1 mc. reference oscillator 43 has its output applied to the other input of the phase detector 42. The output from the phase detector 42 is a D.C. level voltage containing the modulating waveforms as an A.C. component thereof. The A.C. component may be derived at output 44 which is D.C. isolated from the detector by a capacitor 45. The D.C. voltage level is an error voltage which is applied to the input of the voltage control oscillator 40 through an error filter 46, the filter 46 removing transients and noise above one cycle per second. The components 39–42 and 45 form a phase tracking, null seeking loop that produces a zero level D.C. voltage from the phase detector 42, allowing the phase modulating waveforms to be derived at the output 44. The bandwidth of the phase tracking loop need be large enough only to pass the side bands generated by the modulation. Accordingly, the amount of noise present in the loop at the point the modulation is recovered is much smaller than at the input to the tracking filter.

The other output of the voltage control oscillator 40 is applied to an input of a mixer 47. The other input of the mixer 47 is connected to the output of the oscillator 43. The output of the mixer 47, appearing at an output 48, is the difference between the two inputs to the mixer, equal to the carrier frequency. The binary intelligence signal is, thus, derived at the output 44 and a carrier frequency signal is derived at the output 48, allowing both signals to be separated by the signal receiver of FIG. 3.

An additional feature of the present invention is that there is an amplitude modulation imposed on the carrier as a result of the phase modulation. The phase of this amplitude modulation is independent of the binary message transmitted by the phase modulated carrier wave. Therefore, minor modification of the receiving circuit of FIG. 3 would enable this amplitude modulation to be detected and used as a synchronizing signal useful in decoding the transmitted message. To detect this signal, the circuit of FIG. 3 need only be provided with an additional phase detector of conventional design having its input connected to the output of the filter 41. The reference signal applied thereto may be derived by shifting in phase 90° the output of the oscillator 43. The output of the additional phase detector would then provide the amplitude modulated signal.

Obviously, many modifications and variations of the present invention are possible in the light of the above teachings. It is therefore to be understood that within the scope of the appended claims the invention may be practiced otherwise than as specifically described.

What is claimed is:

1. A transmission system comprising:
    a generator for generating a carrier wave,
    a modulating wave generator for selectively generating either of a pair of symmetrical waves, said waves being 180° out of phase with each other and each containing an equal number of positive and negative modulating lobes, said waves being respectively indicative of a binary zero and a binary one,
    a phase modulator capable of advancing and retarding the phase of said carrier wave by equal amounts in response respectively to said positive and negative modulating lobes,
    means for applying said symmetrical wave and said carrier wave to said phase modulator, wherein the phase of said carrier wave is advanced and retarded by equal amounts for each binary bit to be transmitted,
    a transmitter, and
    means for applying said phase modulated carrier wave to said transmitter, thereby broadcasting an intelligence signal which contains a carrier wave with a minimized integrated phase shift.

2. The transmission system of claim 1 in which said symmetrical waves each contain a plurality of positive lobes and an equal plurality of negative lobes for each binary bit to be transmitted.

3. The transmission system of claim 1 further including:
    a memory for storing intelligence in a binary bit form, and
    a clock for reading the intelligence from said memory into said modulating wave generator at predetermined intervals.

References Cited

UNITED STATES PATENTS

| | | | |
|---|---|---|---|
| 3,191,176 | 6/1965 | Guier | 343—112 |
| 3,263,188 | 7/1966 | Sloan | 332—23 |
| 3,078,416 | 2/1963 | McAuliffe. | |
| 3,160,812 | 12/1964 | Scantlin | 325—30 |

ROBERT L. GRIFFIN, *Primary Examiner.*

J. T. STRATMAN, *Assistant Examiner.*